L. W. KLUG.
SEED CORN RACK AND STAND.
APPLICATION FILED JULY 31, 1912.

1,062,242.

Patented May 20, 1913.

Witnesses
W. C. Fielding
Wm. S. Fowler

Inventor
L. W. Klug,
By
Attorneys

COLUMBIA PLANOGRAPH CO., WASHINGTON, D. C.

UNITED STATES PATENT OFFICE.

LOUIS W. KLUG, OF WOONSOCKET, SOUTH DAKOTA.

SEED-CORN RACK AND STAND.

1,062,242.

Specification of Letters Patent.

Patented May 20, 1913.

Application filed July 31, 1912. Serial No. 712,613.

*To all whom it may concern:*

Be it known that I, LOUIS W. KLUG, a citizen of the United States, residing at Woonsocket, in the county of Sanborn, State of South Dakota, have invented certain new and useful Improvements in Seed-Corn Racks and Stands; and I do hereby declare the following to be a full, clear, and exact description of the invention, such as will enable others skilled in the art to which it appertains to make and use the same.

This invention relates to improved racks for seed corn and has for an object to provide a sectional rack of extremely simple construction and novel means for supporting the same whereby the ears of the corn in any section may be reached without difficulty.

Another object is to provide a rack of simple formation and divided into a number of sections each containing a predetermined number of ears, and a stand upon which the rack may be readily rotated to bring the desired section into proper position.

With the above and other objects in view, my invention will be more fully described, illustrated in the accompanying drawings, which show a preferred embodiment of my device and then specifically pointed out in the claim which are attached to and form a part of this application.

Figure 1:
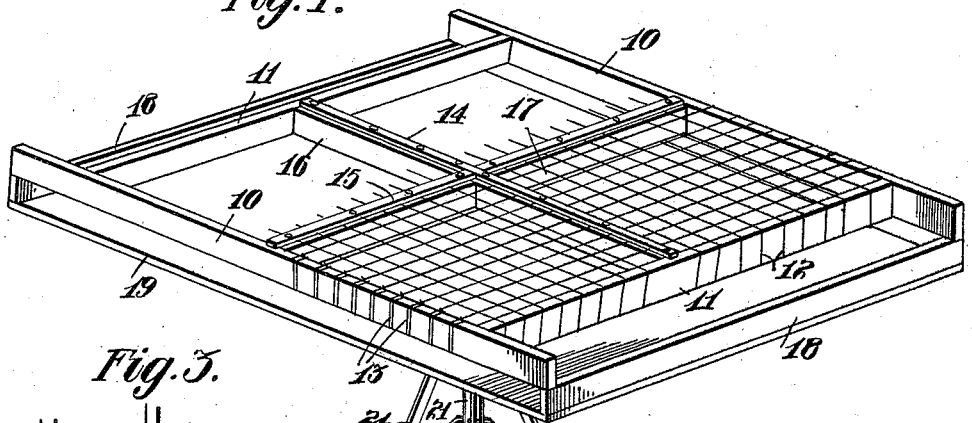
Figure 3:
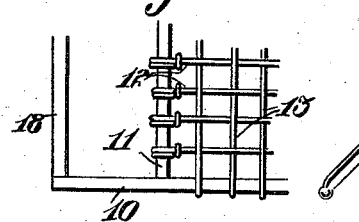
Figure 5:
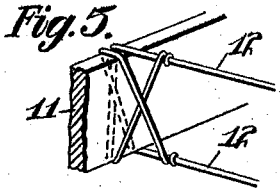
Figure 2:
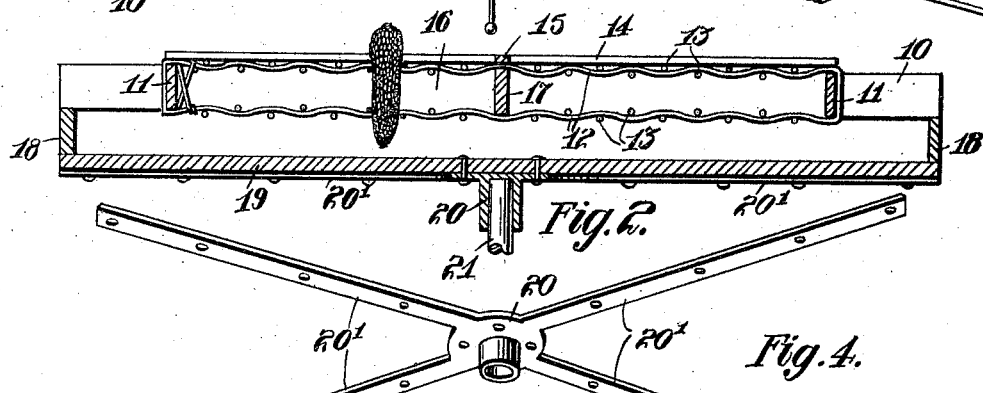
Figure 4:
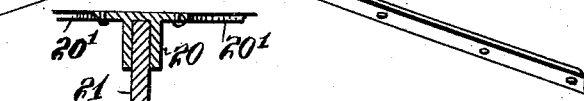
Figure 6:
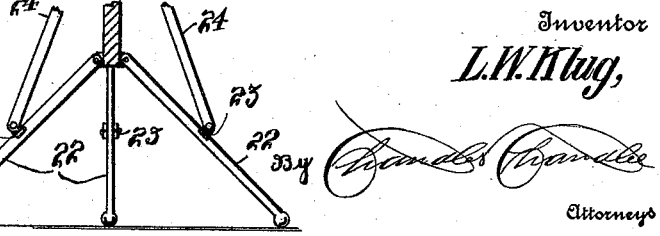

In the drawings: Figure 1 is a perspective view of the complete device. Fig. 2 is a central longitudinal section through the rack and the upper portion of the stand. Fig. 3 is a fragmentary view of one corner of the stand. Fig. 4 is a detail view of the rack support secured to the under side of the rack and adapted for removable engagement upon the stand. Fig. 5 is an enlarged fragmentary detail view, showing the manner of securing the wires. Fig. 6 is a sectional view through the stand.

Referring more specifically to the drawings, in which similar reference numerals designate corresponding parts throughout, 10 designates the side members and 11 the end members of the frame, the end members 11 being positioned inwardly of the ends of the side members and secured thereto as clearly shown in the drawings.

The spaced longitudinal wires 12 have their opposite ends secured to the end members 11 while the transverse spaced wires 13 have their opposite ends secured to the side members 10, thus forming small squares to receive the ears of corn in vertical position, as will be clearly understood. Secured upon the top of the frame are the crossed partition members 14 and 15, the partition member 14 having its opposite ends secured centrally upon the end members 11 while the partition member 15 extends at a right angle thereto and has its opposite ends secured centrally upon the side member 10 of the frame, thus dividing the frame into four sections. Immediately beneath the crossed partition members 14 and 15 are the brace strips 16 and 17 connecting the end members 11 and side members 10 respectively to brace the frame.

It will be understood that the wires 12 and 13 are secured to the upper faces of the frame members 10 and 11 while a duplicate set 12 and 13 are secured to the under faces of the members 10 and 11 immediately beneath the first set. The wires 12 and 13 are properly spaced to provide square pockets for receiving the ears of corn and I desire to provide a suitable number of wires 12 and 13 to form approximately one hundred pockets in each section to receive the same number of ears of corn and the wires are arranged in such manner that they will readily spread or give for an extra large ear and will also securely hold the average size or small ears in upright position.

Secured upon the under faces of the side members 10, at their opposite ends, are the cross beams 18 and to the under sides of the cross beams 18 is secured the floor 19. The floor 19 carries the socket 20 centrally upon its under face which socket is adapted to be removably positioned upon the upper end of the stand 21 to the lower end of which are pivoted the supporting legs 22. The socket 20 is provided with arms 20' which extend to the opposite corners of the floor 19, thus relieving the center of the floor of the strain, it being understood that the arms 20' are provided with suitable space openings for securing means. Pivoted between ears 23 carried by the supporting legs 22 are the lower ends of the adjusting arms and bracing arms 24 which have their upper ends pivotably connected to the collar 25 which is slidably mounted upon the stand 21 and adapted to be held in adjusted position thereon by means of the set screw 26 to adjust the height of the stand and thus raise or lower the rack.

It will be clearly apparent that when the stand is not in use it may be folded into compact form by sliding the collar 25 toward the upper end thereof and folding the supporting legs 22 and arms 24 against the stand. It will also be evident that the rack may be readily rotated upon the stand to bring any section into the desired position, thus eliminating the necessity of walking around the rack to reach the ears of corn in the different sections thereof.

It will be apparent that I have constructed a rack and stand of extremely simple construction and which will be highly efficient in use and while I have shown the preferred form of the device it will be understood that various changes may be made in the minor details of construction without departing from the spirit of my invention.

What I claim is:

The combination with a rack comprising an end and side frame members, means for bracing the members, means above the bracing means for dividing the rack in sections, longitudinal and transverse wires for supporting ears of corn, said wires being secured to the upper face of the frame members, a second set of wires secured to the under face of the frame members, and a support secured to the under side of the frame members; of a stand to receive thereupon the support secured to the rack.

In testimony whereof, I affix my signature, in presence of two witnesses.

LOUIS W. KLUG.

Witnesses:
 ROBT. HUMAIN,
 BEN REFERM.

Copies of this patent may be obtained for five cents each, by addressing the "Commissioner of Patents. Washington, D. C."